S. S. Sherwood.
Hoop Skirt.

No. 3360 Reissued Apr. 6, 1869.

Witnesses
Martin D. Landy
John Cumby

Inventor
Saml. S. Sherwood
" "

United States Patent Office.

JASON B. LOOMIS, OF CHELSEA, MASSACHUSETTS, ASSIGNEE, BY MESNE ASSIGNMENTS, OF SAMUEL S. SHERWOOD, OF NEW YORK, N. Y.

*Letters Patent No.* 28,941, *dated June* 26, 1860; *reissue No.* 3,360, *dated April* 6, 1869.

IMPROVEMENT IN SKELETON-SKIRTS.

The Schedule referred to in these Letters Patent and making part of the same.

Specification of certain Improvements in Skeleton-Skirts invented by SAMUEL S. SHERWOOD, of the city, county, and State of New York.

*Nature and Objects of the Invention.*

This invention is designed to secure the vertical supports, or tapes which connect the hoops with each other, in a substantial and permanent manner to the covering of the hoops; and The leading feature of this invention consists in the combination, with two or more skirt-hoops, of a tape or braid, or their equivalent, extending from hoop to hoop, and sewn through the covering of the hoop, substantially as hereinafter set forth.

*Description of the Accompanying Drawings.*

*General Description.*

Figure 1:
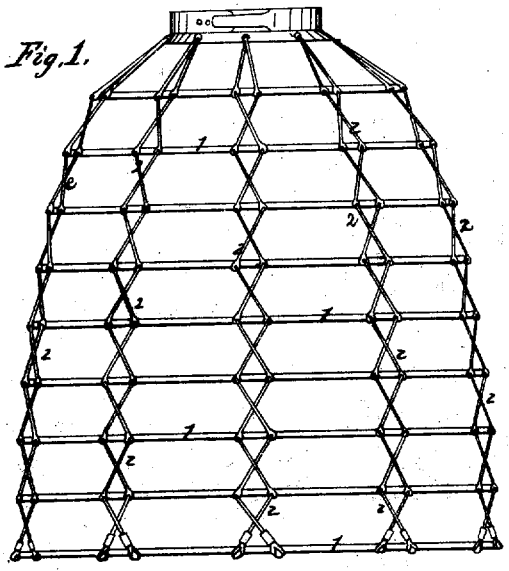
Figure 1 is a side elevation of a skirt which embodies the said invention.
Figure 2:
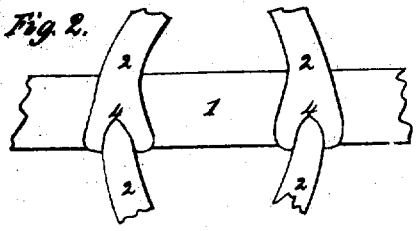
Figure 2 is a detail side elevation, on an enlarged scale, of a portion of a hoop, with the tapes or braids attached.

In the construction represented in the drawings, 1 1 are the hoops of the skirt, which are enveloped in a braided covering in the usual manner, and 2 2 are the braids or tapes, or their equivalents, above mentioned, which extend from hoop to hoop, to form the fastening, and which are here represented as also constituting the vertical supports which retain the hoops in their proper position, or the proper distance from each other.

In the construction here shown, these braids or tapes are represented as being sewn through the covering of the hoops, thereby preventing the hoops from slipping laterally upon the tapes, or equivalent.

The said tapes, or equivalent, are also represented as being returned over the hoops, thereby embracing them, and relieving the coverings of the hoops from any undue strain which might otherwise be thrown upon them.

The said tapes or braids are also represented as being sewn through the vertical supports, which, in the construction here represented, they constitute, thereby preventing the hoops from slipping upon the said supports.

Each of these features of construction performs its particular function, and in combination with each other, they consitute a peculiarly strong and reliable fastening.

Figure 3:
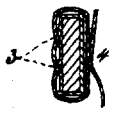
Figure 3 is a vertical section, also enlarged, showing more clearly the manner of attaching the tapes or braids to the hoops.
Figure 4:
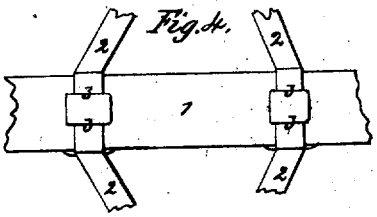
Figure 4 is a detail side elevation, on the same scale as fig. 2, showing the reverse side of the hoop, with the tapes or braids attached.

In constructing a skirt embodying all of these features of this invention, the braids, or their equivalents, are sewn through the covering of the hoop, as shown at 3 3, in figs. 3 and 4, and being returned over the hoop, are sewn through themselves or the vertical support, as shown at 4, in the same figures. They are then extended to the next hoop, and the same operation there repeated. This mode of fastening may be carried through the entire skirt, as represented in the drawings, the end of the tape, after being attached to the lower hoop, being secured by a tag, as shown, or in any other manner that may be deemed convenient or desirable.

Figure 5:
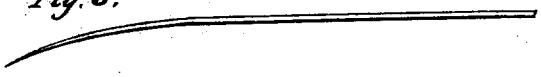
Figure 5 is an edge view of a needle suitable to be used in attaching the tapes or braids to the hoops.
Figure 6:
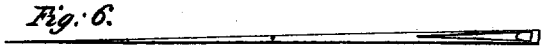
Figure 6 is a side view of the said needle.

Figs. 5 and 6 represent a needle, suitable for performing the work above described, the principal peculiarity of this needle being that it is so formed at the point as to facilitate its closely following the surface of the hoop when held with the curved side toward the hoop.

I am aware that tapes or vertical supports have been stitched to the covering of hoops with thread, said thread being broken at each hoop, and not extending from hoop to hoop; but this last-named construction does not realize the advantages of any part of the invention herein set forth, for the reason, among others, that the thread not being continuous, the stitch is liable to become unfastened.

*Claims.*

I claim as the invention of the said SAMUEL S. SHERWOOD—

1. The combination, with hoops of a skeleton-skirt, of a tape, braid, or equivalent, extending from hoop to hoop, and sewn through the covering of the hoops, substantially as hereinbefore set forth.

2. The combination, with hoops of a skeleton-skirt, of a tape, braid, or its equivalent, extending from hoop to hoop, and sewn through the covering of the hoop, and returned over the hoop, substantially as hereinbefore set forth.

3. The combination, with hoops of a skeleton-skirt, of a tape, braid, or equivalent, extending from hoop to hoop, and sewn through the covering of the hoop, and through the tapes or vertical support, substantially as hereinbefore set forth.

4. The combination, with hoops of a skeleton-skirt, of a tape, braid, or equivalent, extending from hoop to hoop, and sewn through the covering of the hoop, returned over the hoop, and sewn through the tapes or vertical support, substantially as hereinbefore set forth.

JASON B. LOOMIS.

Witnesses:

ALEX. K. YOUNG,

J. R. SNOW.